United States Patent
Yoshida et al.

(10) Patent No.: US 9,323,484 B2
(45) Date of Patent: Apr. 26, 2016

(54) PRINT INSTRUCTION APPARATUS, PRINTER, PRINTING SYSTEM, PRINT INSTRUCTION METHOD, AND NON-TRANSITORY COMPUTER READABLE MEDIUM

(71) Applicant: FUJI XEROX CO., LTD., Minato-ku, Tokyo (JP)

(72) Inventors: Hiroo Yoshida, Kanagawa (JP); Yutaka Kojima, Kanagawa (JP); Shinichi Takano, Kanagawa (JP); Taro Yamazaki, Kanagawa (JP); Masayuki Iwasawa, Kanagawa (JP); Naoki Yasuda, Kanagawa (JP); Issei Matsushita, Kanagawa (JP); Shingo Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/471,999

(22) Filed: Aug. 28, 2014

(65) Prior Publication Data

US 2015/0227826 A1 Aug. 13, 2015

(30) Foreign Application Priority Data

Feb. 12, 2014 (JP) ................................ 2014-024869

(51) Int. Cl.
*G06F 3/12* (2006.01)
*G06K 15/00* (2006.01)

(52) U.S. Cl.
CPC .............. *G06F 3/121* (2013.01); *G06F 3/1229* (2013.01); *G06F 3/1235* (2013.01); *G06F 3/1285* (2013.01)

(58) Field of Classification Search
None
See application file for complete search history.

(56) References Cited

U.S. PATENT DOCUMENTS

| 2005/0104272 A1* | 5/2005 | Watanabe et al. ............ 271/9.05 |
| 2012/0286465 A1* | 11/2012 | Ooba ........................... 271/9.01 |

FOREIGN PATENT DOCUMENTS

| JP | 2000-229738 A | 8/2000 |
| JP | 2006-185377 A | 7/2006 |

\* cited by examiner

*Primary Examiner* — Dov Popovici
(74) *Attorney, Agent, or Firm* — Sughrue Mion, PLLC

(57) ABSTRACT

A print instruction apparatus includes a group information acquisition unit that acquires information identifying a feeder unit included in a group including two or more feeder units, from among a plurality of feeder units mounted on a printer to feed paper sheets, where if one feeder unit in the group runs out of paper sheets during printing, another feeder unit in the same group is configured to feed paper sheets, and a display that acquires information related to a remaining amount of paper sheets each of the feeder units in the group, and displays information related to a total remaining amount of paper sheets in the group.

14 Claims, 11 Drawing Sheets

| FEEDER NAME | SHEET SIZE | MAXIMUM CAPACITY | GROUP SETTING |
|---|---|---|---|
| FIRST PAPER SHEET FEEDER UNIT 71 | A4 | 500 SHEETS | GROUP A 1500 SHEETS |
| SECOND PAPER SHEET FEEDER UNIT 72 | A4 | 500 SHEETS | |
| THIRD PAPER SHEET FEEDER UNIT 73 | A4 | 500 SHEETS | |
| FOURTH PAPER SHEET FEEDER UNIT 74 | A3 | 500 SHEETS | GROUP B 2500 SHEETS |
| FIFTH PAPER SHEET FEEDER UNIT 75 | A3 | 2000 SHEETS | |
| SIXTH PAPER SHEET FEEDER UNIT 76 | - | 100 SHEETS | OFF |

FIG. 5

| FEEDER NAME | SHEET SIZE | MAXIMUM CAPACITY | GROUP SETTING |
|---|---|---|---|
| FIRST PAPER SHEET FEEDER UNIT 71 | A4 | 500 SHEETS | GROUP A 1500 SHEETS |
| SECOND PAPER SHEET FEEDER UNIT 72 | A4 | 500 SHEETS | |
| THIRD PAPER SHEET FEEDER UNIT 73 | A4 | 500 SHEETS | |
| FOURTH PAPER SHEET FEEDER UNIT 74 | A3 | 500 SHEETS | GROUP B 2500 SHEETS |
| FIFTH PAPER SHEET FEEDER UNIT 75 | A3 | 2000 SHEETS | |
| SIXTH PAPER SHEET FEEDER UNIT 76 | - | 100 SHEETS | OFF |

PRINT INSTRUCTION APPARATUS, PRINTER, PRINTING SYSTEM, PRINT INSTRUCTION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-024869 filed Feb. 12, 2014.

BACKGROUND

Technical Field

The present invention relates to a print instruction apparatus, a printer, a printing system, a print instruction method, and a non-transitory computer readable medium.

SUMMARY

According to an aspect of the invention, a print instruction apparatus is provided. The print instruction apparatus includes a group information acquisition unit that acquires information identifying a feeder unit included in a group of two or more feeder units, from among a plurality of feeder units mounted on a printer to feed paper sheets, wherein if one feeder unit in the group runs out of paper sheets during printing, another feeder unit in the group is configured to feed paper sheets. The print instruction apparatus further includes a display that acquires information related to a remaining amount of paper sheets in each of the feeder units in the group, and displays information related to a total remaining amount of paper sheets in the group based on the acquired information.

BRIEF DESCRIPTION OF THE DRAWINGS

Exemplary embodiments of the present invention will be described in detail based on the following figures, wherein:

FIG. 5 illustrates a group setting of a paper sheet feeder unit;

DETAILED DESCRIPTION

Exemplary embodiments of the present invention are described below with reference to the drawings.

Figure 1:
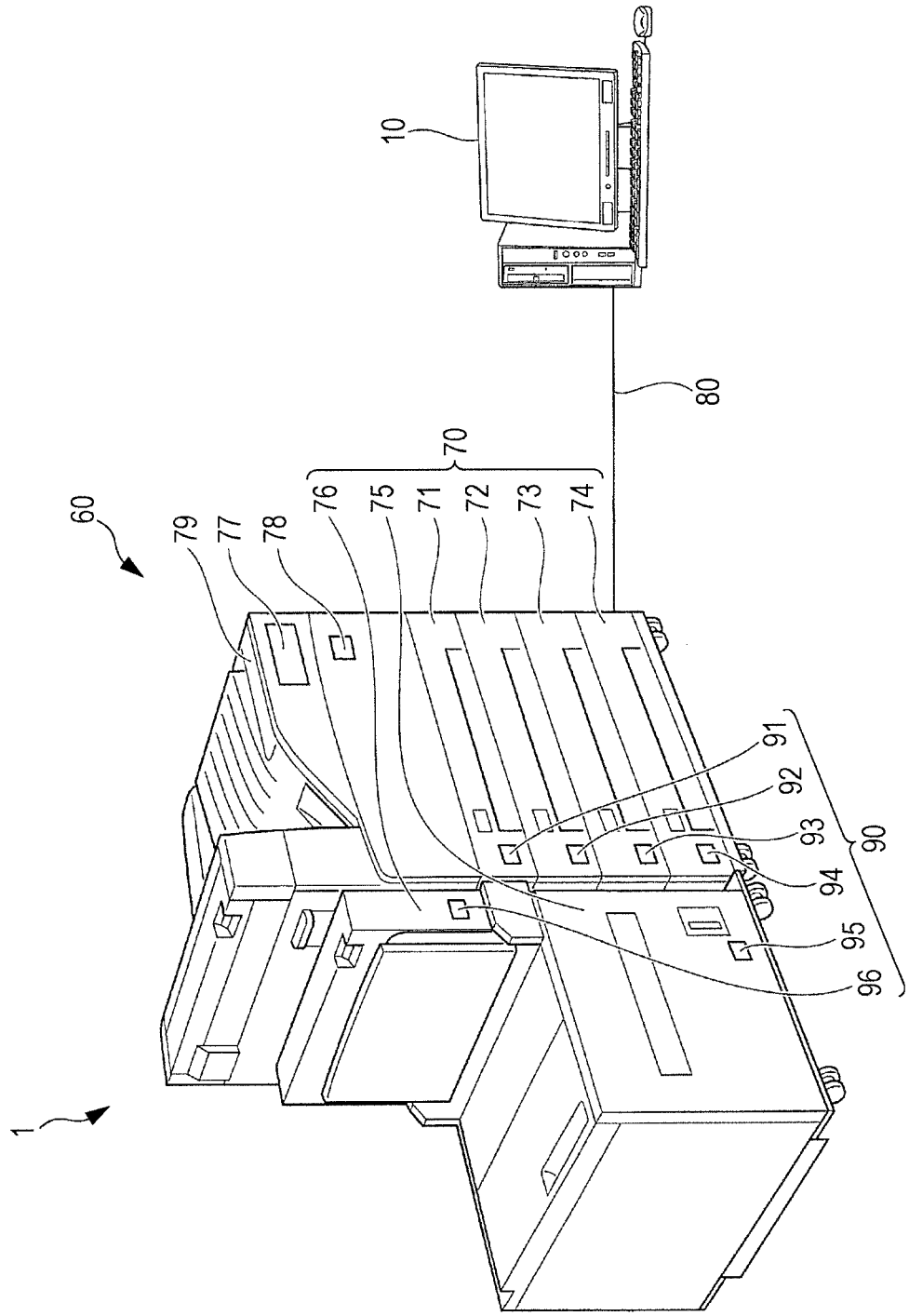
FIG. 1 generally illustrates an image forming system of an exemplary embodiment.

FIG. 1 illustrates an image forming apparatus 1 of an exemplary embodiment.

As illustrated in FIG. 1, the image forming apparatus (printing system) 1 includes a terminal apparatus 10, and an image forming apparatus 60 connected to the terminal apparatus 10 via a network 80.

The terminal apparatus 10 as one example of a print instruction apparatus is a computer configured to instruct the image forming apparatus 60 to print. The terminal apparatus 10 may be a personal computer (PC). The PC herein may operate as a client PC or a server PC.

The image forming apparatus 60 as an example of a printer has an image forming function (printing function) to form an image on a medium, such as a paper sheet. The image forming apparatus 60 may include, besides the image forming apparatus, a multi-function apparatus having an image reading function to read an image from a medium such as a paper sheet, and a facsimile function.

The network 80 is a communication network configured to perform information communications between the terminal apparatus 10 and the image forming apparatus 60. The network 80 may be a local area network (LAN) or the Internet.

The image forming apparatus 60 is described with reference to FIG. 1.

As illustrated in FIG. 1, the image forming apparatus 60 includes an image forming unit (not illustrated) that forms an image on a paper sheet, paper sheet feeder units 70 (not illustrated) that feed loaded paper sheets one by one to the image forming unit, a controller 77 that controls each mechanism in the image forming apparatus 60, a communication interface (I/F) 78 that communicates with the outside, and a user interface (UI) 79 that includes a display panel, receives an instruction from a user, and displays a message to the user. The paper sheet feeder units 70 include a first paper sheet feeder unit 71, a second paper sheet feeder unit 72, a third paper sheet feeder unit 73, a fourth paper sheet feeder unit 74, a fifth paper sheet feeder unit 75, and a sixth paper sheet feeder unit 76. In the following discussion, any one of the first paper sheet feeder unit 71 through the sixth paper sheet feeder unit 76 may be referred to as "the paper sheet feeder unit 70" for convenience of explanation.

The paper sheet feeder unit 70 includes a paper sheet sensor 90 that detects an amount of and a sheet size of paper sheets (remaining amount of paper sheets) loaded therein. The paper sheet sensor 90 may be a contactless sensor using infrared rays.

More specifically, the first paper sheet feeder unit 71, the second paper sheet feeder unit 72, the third paper sheet feeder unit 73, the fourth paper sheet feeder unit 74, the fifth paper sheet feeder unit 75, and the sixth paper sheet feeder unit 76 respectively include a first paper sheet sensor 91, a second paper sheet sensor 92, a third paper sheet sensor 93, a fourth paper sheet sensor 94, a fifth paper sheet sensor 95, and a sixth paper sheet sensor 96. Each of the first paper sheet sensor 91 through the sixth paper sheet sensor 96 detects the remaining amount and the sheet size of paper sheets. Alternatively, each of the first paper sheet sensor 91 through the sixth paper sheet sensor 96 may include multiple sensor devices (not illustrated), one sensor device may detect the remaining amount of paper sheets, and another sensor device may detect the sheet size.

Figure 2:
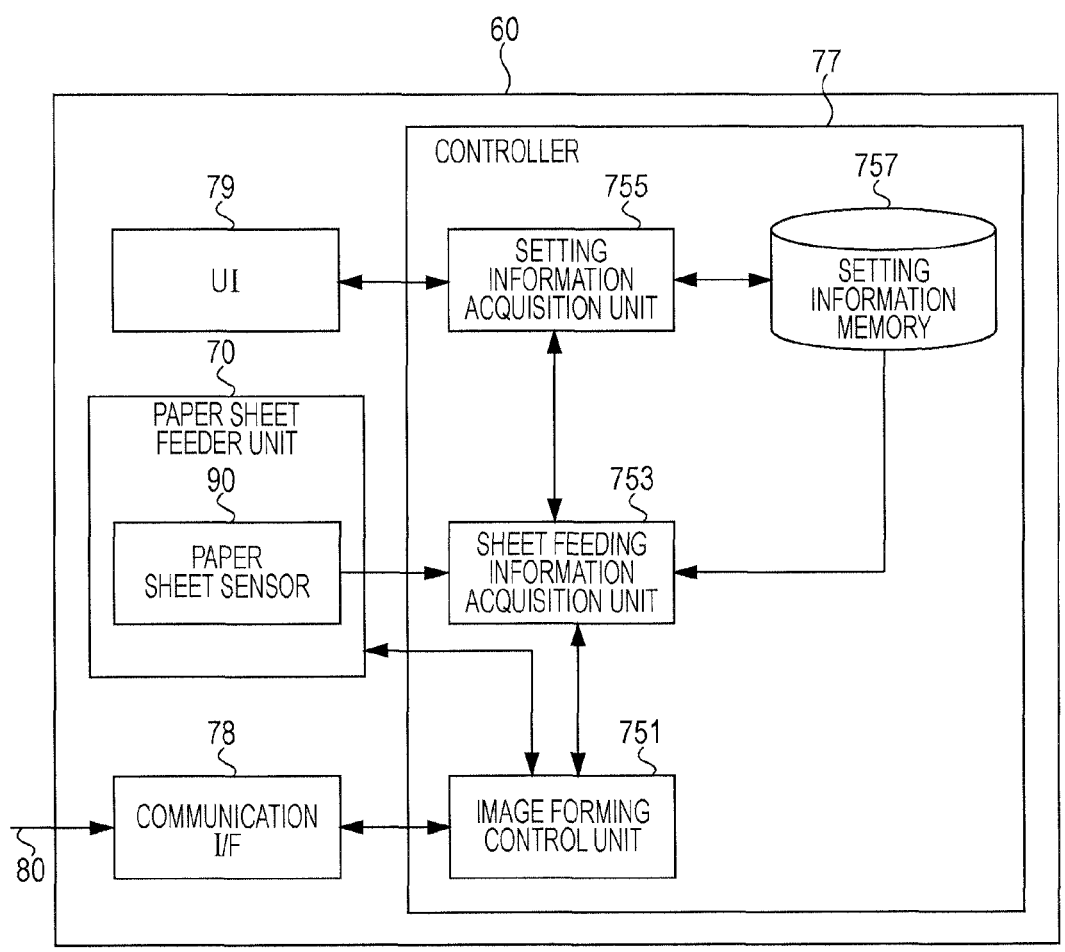
FIG. 2 illustrates a functional configuration of a controller of the exemplary embodiment.

FIG. 2 illustrates a functional configuration of the controller 77 of the exemplary embodiment.

The controller 77 in the image forming apparatus 60 is described with reference to FIG. 2.

The image forming apparatus 60, as the functions of the controller 77, includes an image forming control unit 751, a sheet feeding information acquisition unit 753, a setting information acquisition unit 755, and a setting information memory 757.

The image forming control unit 751 receives a print instruction from the terminal apparatus 10 via the communication I/F 78, and controls the image forming unit (not illustrated), and the paper sheet feeder unit 70.

The image forming control unit 751 generates operation information of the image forming apparatus 60, and outputs the operation information via the communication I/F 78 to the outside. For example, the operation information of the image forming apparatus 60 includes group setting information (described below) and paper feeding information (described below) in the image forming apparatus 60, printing information indicating a printing status of the image forming apparatus 60, and error information related to an error occurring in the image forming apparatus 60. The operation information of the image forming apparatus 60 also includes communication protocols according to which information about an apparatus connected via a communication unit is obtained. For example, the operation information may include management information base (MIB) information based on simple network management protocol (SNMP).

The sheet feeding information acquisition unit 753 acquires, from the paper sheet sensor 90, information related to the paper sheets fed by the paper sheet feeder unit 70. The information related to the paper sheets indicate the remaining amount and sheet size of paper sheets.

The setting information acquisition unit 755 as an example of a group information acquisition unit acquires information related to a group setting (described below) of the paper sheet feeder unit 70 from the UI 79.

The setting information memory 757 stores the information related to the group setting acquired by the setting information acquisition unit 755 (information identifying a feeder unit included in a group). The setting information memory 757 also stores information related to a group setting screen (described below).

The controller 77 includes a central processing unit (CPU) (not illustrated), a memory, and a hard disk drive (HDD). The CPU executes arithmetic processing, thereby implementing the above-described functions. The memory serves as a memory area to store data for use in the execution of a variety of programs. The magnetic disk device serves as a memory area to store input data to a program or output data from the program.

Figure 3:
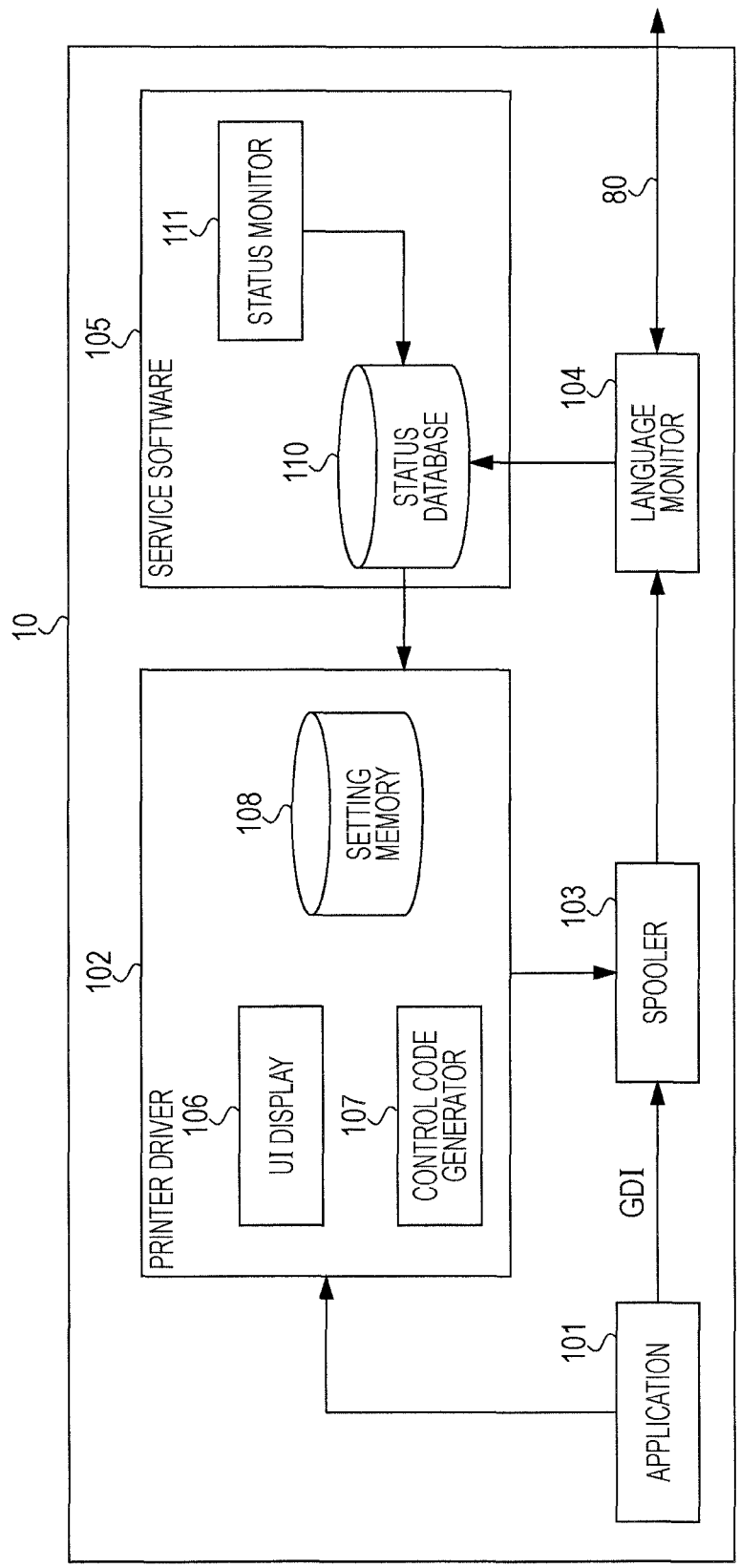
FIG. 3 illustrates a functional configuration of a terminal apparatus of the exemplary embodiment.

FIG. 3 illustrates a functional configuration of the terminal apparatus 10 of the exemplary embodiment.

The terminal apparatus 10 is described below with reference to FIG. 3.

Referring to FIG. 3, the terminal apparatus 10 includes an application program (hereinafter simply referred to as "application") 101, a printer driver 102, a spooler 103, a language monitor 104, and service software 105.

The application 101 creates original document data in response to an operation of a user, and retrieves created original document data.

In response to a print request of the original document (print) data from the application 101, the printer driver 102 transmits print instruction data to the image forming apparatus 60 via the spooler 103 and the language monitor 104. The printer driver 102 thus controls the outputting of the original document of the image forming apparatus 60.

The terminal apparatus 10 includes, as functions of the printer driver 102, a UI display 106, a control code generator 107, and a setting memory 108.

The UI display 106 functions as a user interface with the user. More specifically, the UI display 106 presents information to a display mechanism 15 (described below) of the terminal apparatus 10 and receives an operation of the user via the display mechanism 15.

The control code generator 107 as an example of a display generates a control code (print instruction data) instructing the image forming apparatus 60 to print, based on the original document data print-instructed by the application 101. The control code generator 107 outputs to the UI display 106 an instruction to cause the display mechanism 15 to display a print setting screen 151 (described below) and an alert screen 152 (described below). The control code generator 107 calculates a total remaining amount of paper sheets as information related to a remaining amount of paper sheets loaded in a group of paper sheet feeder units 70, and a starting total amount of paper sheets at the start of image forming, based on the setting information (described below), and paper feeding information (described below) stored on the status database 110. The control code generator 107 counts the number of pages of the original document data that is successively transmitted by the application 101 from the start of image forming. In other words, the control code generator 107 counts the total number of paper sheets of the original document output through the printer driver 102. The control code generator 107 determines an out-of-paper state based on the starting total remaining amount of paper sheets and the counted number of pages of the original document data.

The setting memory 108 stores information related to the print instruction based on the original document data print-instructed by the application 101. For example, the setting memory 108 stores the number of pages of the original document data transmitted by the application 101.

In response to the print instruction from the printer driver 102, the spooler 103 is a program that temporarily stores print instruction data that is to be output to the image forming apparatus 60 via a graphic device interface (GDI) as a rendering instruction of a digital document. The spooler 103 also retrieves the print instruction data in accordance with a predetermined rule and transfers the print instruction data to the language monitor 104. Windows (registered trademark) spooler may be used for the spooler 103.

The language monitor 104 as an example of a group information acquisition unit performs duplex communications with the image forming apparatus 60. The language monitor 104 monitors the image forming apparatus 60 while transmitting page description language (PDL) data to the image forming apparatus 60.

The language monitor 104 queries the image forming apparatus 60 about the operation information at predetermined time intervals to obtain the operation information. For example, the language monitor 104 obtains the operation information using the MIB information of the image forming apparatus 60.

The service software 105 obtains the operation information of the image forming apparatus 60 and notifies the user of the operation information. The service software 105 operates as a status database 110 and a status monitor 111. The status database 110 stores the operation information of the image forming apparatus 60 notified by the language monitor 104. The status monitor 111 displays data on the display mechanism 15 (discussed below) of the terminal apparatus 10, based on the operation information of the image forming apparatus 60 stored on the status database 110.

The original document data includes information related to styles, including the alignment and size of each page, line feed and character feed width, margin width, delineation of page (end of page), and information related to characters including character code, font, and character size. The print instruction data is PDL data described by page description language. The print instruction data also includes image quality instruction related to the resolution of the printer, tonal gradation, the quality of screen, and rendering instruction of characters, graphics, and images.

Figure 4:
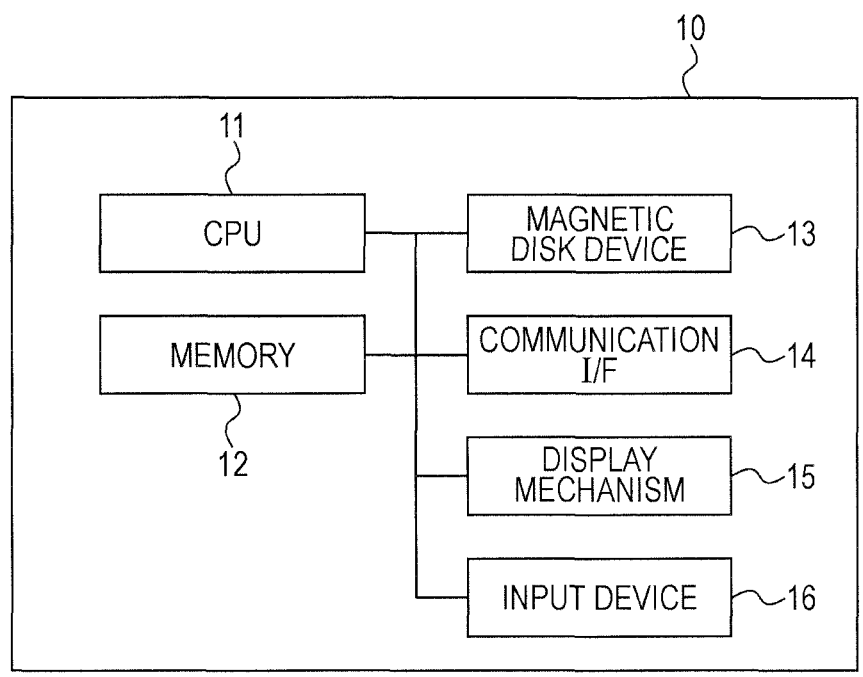
FIG. 4 illustrates a hardware configuration of the terminal apparatus.

FIG. 4 illustrates a hardware configuration of the terminal apparatus 10.

Referring to FIG. 4, the hardware configuration of the terminal apparatus 10 is described.

The terminal apparatus 10 includes a central processing unit (CPU) 11 as an arithmetic processor, a memory 12, and a hard disk drive (HDD) 13. The CPU 11 executes a variety of software programs including an operating system (OS) and applications, thereby implementing the functions described above. The memory 12 is a storage area configured to store the variety of software programs and data for use in the software programs. The magnetic disk device 13 is a storage area configured to store input data to the software programs and output data from the software programs.

The terminal apparatus 10 further includes a communication interface 14 to communicate with the outside, the display mechanism 15 including a video memory and a display, and a input device 16 including a keyboard, a mouse, and the like.

FIG. 5 illustrates a group setting of the paper sheet feeder units 70.

The image forming apparatus 60 of the exemplary embodiment includes multiple paper sheet feeder units 70 (the first paper sheet feeder unit 71 through the sixth paper sheet feeder unit 76). In other words, the image forming apparatus 60 includes multiple paper sheet feeding ports (not illustrated) to feed paper sheets.

The image forming apparatus 60 assigns the first paper sheet feeder unit 71 through the sixth paper sheet feeder unit 76 to any groups. Upon receiving a print instruction to perform paper feeding based on the assigned group, the image forming apparatus 60 performs a printing operation with paper sheets supplied from one of the paper sheet feeder units 70 in the group. If the paper sheet feeder unit 70 supplying paper sheets runs out of paper sheets (in a state that paper sheets are not available), another paper sheet feeder unit 70 in the same group starts to supply paper sheets. In other words, if any one of the paper sheet feeder units in the group runs out of paper sheets, the paper sheet feeding source is automatically changed to another paper sheet feeder in the same group without waiting for an operation by the user.

In this way, the user is thus provided with a single paper sheet feeder including multiple third paper sheet feeder units 70, or a large-capacity paper feeder.

The group is set up by the user. For example, the group is set in accordance with the sheet size of paper sheets loaded in the paper sheet feeder units 70.

Referring to FIG. 5, the group setting is described specifically. As illustrated in the example of FIG. 5, The first paper sheet feeder unit 71 through the third paper sheet feeder unit 73 are loaded with paper sheets of A4 sheet size. The fourth paper sheet feeder unit 74 and the fifth paper sheet feeder unit 75 are loaded with paper sheets of A3 sheet size. The sixth paper sheet feeder unit 76, which is a manual feeding tray, is not loaded with any paper sheet. As for the maximum capacity of the paper sheet feeder units 70, each of the first paper sheet feeder unit 71 through the fourth paper sheet feeder unit 74 has a capacity of 500 sheets, the fifth paper sheet feeder unit 75 has a capacity of 2000 sheets, and the sixth paper sheet feeder unit 76 has a capacity of 100 sheets.

The first paper sheet feeder unit 71 through the third paper sheet feeder unit 73 with the paper sheets of the sheet size A4 loaded therewithin are set to be a group A. The fourth paper sheet feeder unit 74 and the fifth paper sheet feeder unit 75 with the paper sheets of the sheet size A3 are set to be a group B. The sixth paper sheet feeder unit 76 is not set up to be any group.

If a print instruction with sheet feeding performed from the group A is received in this setting, the paper feeding starts with the first paper sheet feeder unit 71. If the first paper sheet feeder unit 71 runs out of paper sheets, the second paper sheet feeder unit 72 starts feeding paper sheets. If the second paper sheet feeder unit 72 runs out of paper sheets, the third paper sheet feeder unit 73 starts feeding paper sheets. Paper feeding is thus continuously performed in the order of the first paper sheet feeder unit 71 through the third paper sheet feeder unit 73 forming the group A.

With the group setting described above, the maximum capacity as the group A is a total maximum capacity of the first paper sheet feeder unit 71 through the third paper sheet feeder unit 73, namely, 1500 sheets. The maximum capacity as the group B is a total maximum capacity of the fourth paper sheet feeder unit 74 and the fifth paper sheet feeder unit 75, namely, 2500 sheets.

The two groups (the groups A and B) are set up in the paper sheet feeder units 70 in FIG. 5. Alternatively, a single group, or three or more groups may be set up. The group setting is dependent on the sheet size herein. The exemplary embodiment is not limited to this arrangement. In place of or in addition to the sheet size, the group setting may be performed depending on the alignment according which the paper sheets are fed (with the long side or short side being a leading edge of each paper sheet in the feeding direction), the type of paper sheets (whether the paper sheet is perforated type or not, whether the paper sheets are coated type or not), and other condition including the thickness of each paper sheet.

The order of paper feeding in the group may be set to be any sequence. The paper sheet feeder units 70 may be used in the order of small to large number or large to small number. The paper sheet feeder units 70 may be used in the order of from large to small capacity.

Figure 6:
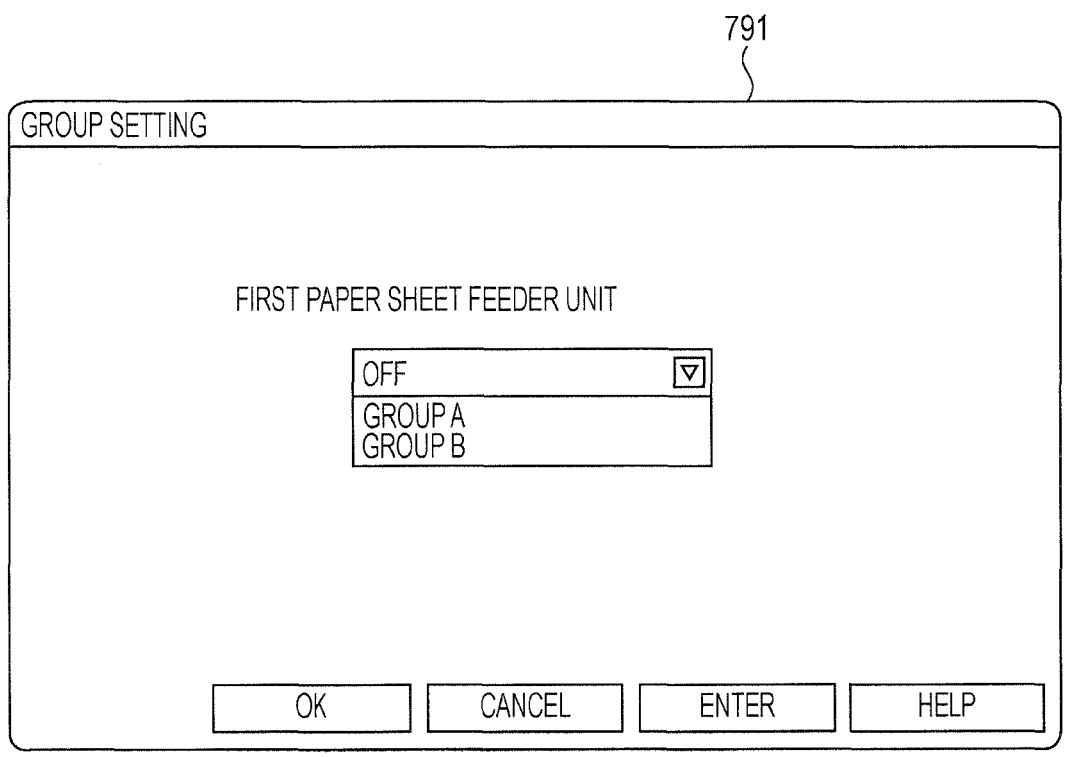
FIG. 6 illustrates an example of a first group setting screen displayed on a user interface (UI) of an image forming apparatus.
Figure 7:
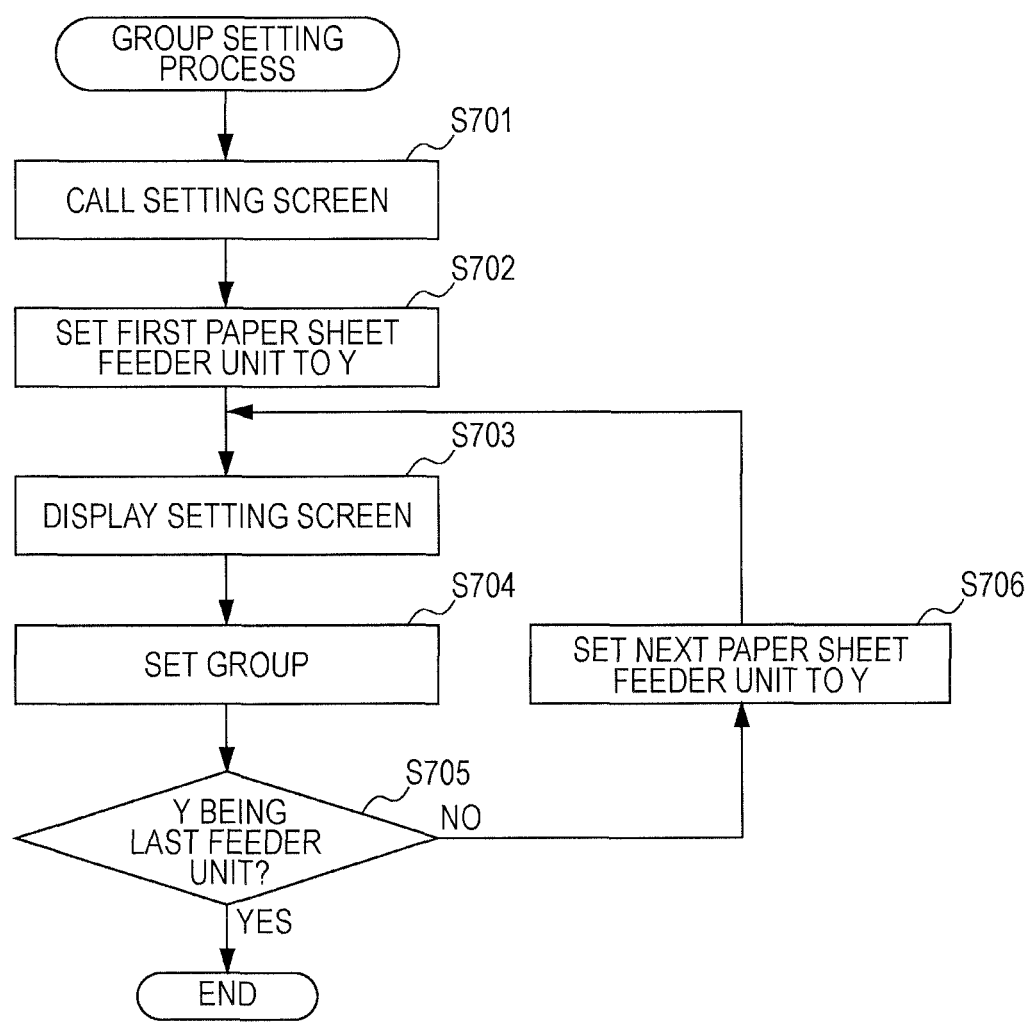
FIG. 7 is a flowchart illustrating an operation example of the group setting in the image forming apparatus.

FIG. 6 illustrates an example of a first group setting screen 791 displayed on the UI 79 in the image forming apparatus 60. FIG. 7 is a flowchart illustrating an operation example of the group setting in the image forming apparatus 60.

The group setting operation by the user is described below. The group setting screen displayed on the UI 79 in the image forming apparatus 60 is described with reference to FIG. 6, and then a specific operation example of the group setting is described with reference to FIG. 7.

As illustrated in FIG. 6, an operation by the user on the UI 79 triggers the displaying of the group setting screen on the UI 79 in the image forming apparatus 60 before the image forming starts on the image forming apparatus 60. The first paper sheet feeder unit 71 through the sixth paper sheet feeder unit 76 have their own group setting screens, and a first group setting screen 791 as the setting screen of the first paper sheet feeder unit 71 is described, for example. The group setting screen is stored on the setting information memory 757.

The group setting of the first paper sheet feeder unit 71 is performed in accordance with the first group setting screen 791.

More specifically, when the user operates the first group setting screen 791, the UI 79 displays a list of group settings. "Off" included in the list of group setting refers to no group setting (the first paper sheet feeder unit 71 alone feeds paper sheets). The "group A" indicates that the first paper sheet feeder unit 71 is set up to be in the group A, and the "group B" indicates that the first paper sheet feeder unit 71 is set up to be in the group B. The user may select any of these settings, and then presses an "OK" button. The group setting of the first paper sheet feeder unit 71 is thus acquired by the setting information acquisition unit 755, and stored on the setting information memory 757.

This operation is performed on each of the second paper sheet feeder unit 72 through the sixth paper sheet feeder unit 76, thereby completing the group setting on the image forming apparatus 60. The image forming control unit 751 controls the paper sheet feeder unit 70 based on the group setting stored on the setting information memory 757 and performs image forming, though this operation is not discussed in detail herein.

A specific operation of the group setting process is described with reference to FIG. 7.

The group setting screen is called in response to an operation of the user on the UI 79 (step S701), in a state prior to the start of the image forming on the image forming apparatus 60 (for example, before the image forming apparatus 60 receives an print instruction from the terminal apparatus 10). The setting information acquisition unit 755 sets the first paper sheet feeder unit 71 to Y (step S702), and the group setting screen of Y (see the first group setting screen 791 of FIG. 6) is displayed on the UI 79 (step S703). As described with reference to FIG. 6, the group Y is set up in accordance with the displayed group setting screen. The group setting is thus stored on the setting information memory 757 (step S704).

The setting information acquisition unit 755 determines whether Y is last in the paper sheet feeder units 70 (step S705). If Y is not last in the paper sheet feeder units 70 (no branch from step S705), the setting information acquisition unit 755 sets a next paper sheet feeder unit (the second paper sheet feeder unit 72, for example) to be Y (step S706). The group setting screen of the second paper sheet feeder unit of Y is displayed on the UI 79 (step S703). If Y is last in the paper sheet feeder units 70 (yes from step S705), the group setting process ends.

The group setting of the paper sheet feeder units 70 performed by the user has been described. Alternatively, the group setting may be pre-stored on the setting information memory 757. Alternatively, during the group setting, the paper sheet sensor 90 detects the sheet size of the paper sheets loaded in the paper sheet feeder unit 70, and the setting information acquisition unit 755 may perform the group setting depending on the detected sheet size.

Even with the group setting performed, one of the paper sheet feeder units 70 forming the group may have no paper sheets loaded therewithin, or may have an insufficient remaining amount of paper sheets. In such a case, the timing of interruption of the image forming caused by the out-of-paper is expected to be sooner. As a result, the time for the image forming may be prolonged, or the frequency of interruptions in the image forming may be increased.

In the exemplary embodiment, the printer driver 102 acquires the remaining amount of paper sheets in each paper sheet feeder unit 70 via the paper sheet sensor 90 in the image forming apparatus 60, and calculates and displays the total remaining amount of paper sheets on each group.

The total remaining amount of paper sheets serves as one of criteria according which the user decides to replenish paper sheets to the paper sheet feeder unit 70 before the image forming. If paper sheets are replenished before starting the image forming, the time for the image forming may be shortened, and the frequency of interruptions in the image forming may be decreased.

The display of the total remaining amount of paper sheets may also serves as one of the criteria according to which the user selects the group. For example, the user may print using the group having a larger total remaining amount of paper sheets.

Figure 8A:
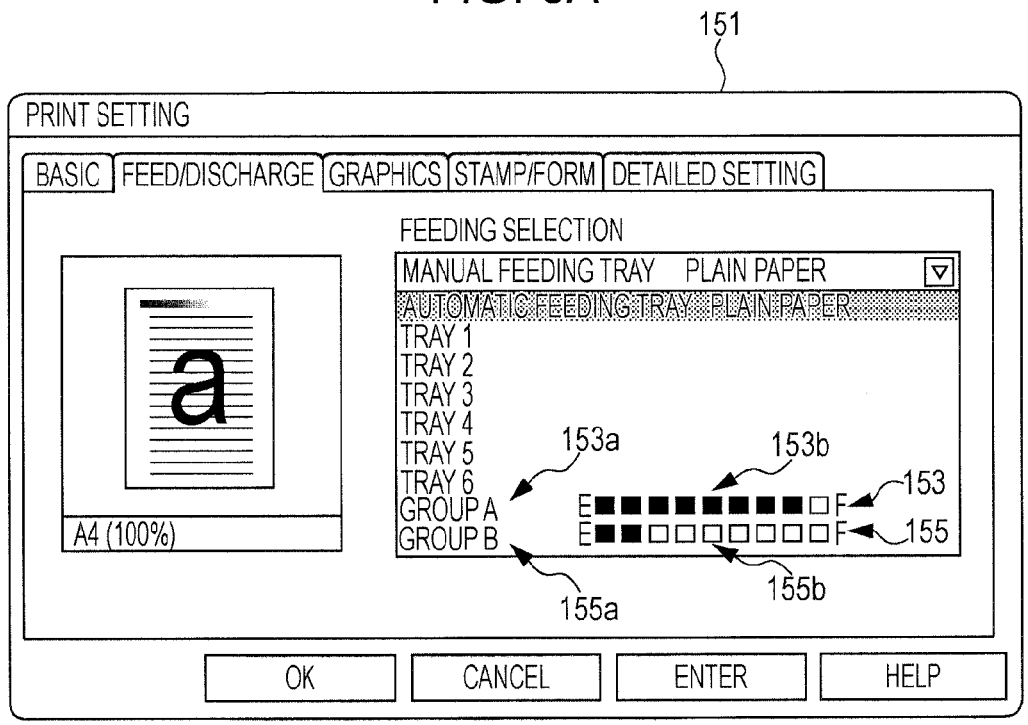
FIG. 8A illustrates an example of a print setting screen.
Figure 8B:
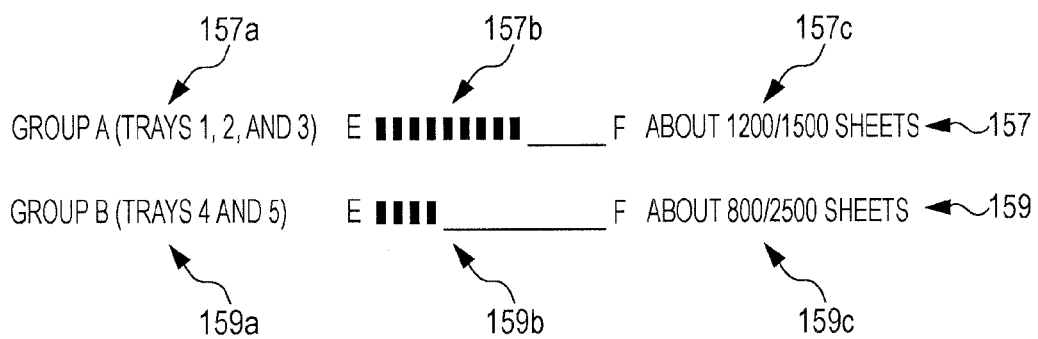
FIG. 8B illustrates group A and group B selection items in a modification.

FIG. 8A illustrates a print setting screen 151, and FIG. 8B illustrates a group A selection item 157 and a group B selection item 159 in a modification.

The print setting screen 151 displaying the total remaining amounts in the groups are described with reference to FIG. 8A and FIG. 8B.

As illustrated in FIG. 8A, before the image forming apparatus 60 starts image forming, the UI display 106 displays the print setting screen 151 in response to an instruction from the control code generator 107 in the terminal apparatus 10. The print setting screen 151 receives a setting when printing is performed on the image forming apparatus 60. The print setting screen 151 is displayed on the display mechanism 15. As illustrated in FIG. 8A, an item in "feeding selection" is displayed when the user presses a "feed/discharge" tab in the print setting screen 151. A list of feed settings is displayed in the item of the "feeding selection".

"Tray 1" through "tray 6" in the list of feeding selection of FIG. 8A indicate that the image forming is performed with paper sheets fed from the first paper sheet feeder unit 71 through the sixth paper sheet feeder unit 76. In description based on the example of FIG. 5, the "group A" means that the first paper sheet feeder unit 71 through the third paper sheet feeder unit 73 set to belong to the group A feed paper sheets. The "group B" means that the fourth paper sheet feeder unit 74 and the fifth paper sheet feeder unit 75 set to belong to the group B feed paper sheets.

In the list of FIG. 8A, a group A selection item 153 of the "group A" includes a group name 153a and information 153b related to the total remaining amount in the group A. A group B selection item 155 of the "group B" includes a group name 155a and information 155b related to the total remaining amount in the group B.

The group A selection item 153 is described herein. The information 153b related to the total remaining amount of the group A in the group A selection item 153 is a bar graph extending between letter "E" (empty with no paper sheets remaining) and letter "F" (full with paper sheets stacked to a maximum capacity). The bar graph includes multiple generally rectangular boxes lining between "E" and "F" (nine generally rectangular boxes in FIG. 8). The length of the bar graph varies as the number of generally rectangular colored boxes increases or decreases depending on the total remaining amount of paper sheets in the group A. In the exemplary embodiment, the user may visibly recognize the total remaining amount in percentage with respect to the maximum capacity of the group.

The remaining amounts of paper sheets in the tray 1 through the tray 6 may be displayed along with the bar graph.

The information related to the total remaining amount is represented by the bar graph. The exemplary embodiment is not limited to the bar graph. The total remaining amount may be represented by a graph of another type, such as a circle graph, or may be indicated using words, such as "small", "standard", or "large". Furthermore, the total remaining amount may be represented by a value of the total remaining amount, such as "the number of sheets".

Information included in the group A selection item 153 and the group B selection item 155 is not limited to the example of FIG. 8A. A group A selection item 157 and a group B selection item 159 of FIG. 8B may be used to indicate the total remaining amount.

More specifically, the group A selection item 157 includes a group name 157a of "trays 1, 2, and 3" (the first paper sheet feeder unit 71 through the third paper sheet feeder unit 73) indicating the paper sheet feeder units 70 belonging to the group A, information 157b related to the total remaining amount of the group A, and estimated amount information 157c indicating an estimated total amount of paper sheets "about 1200 sheets" with respect to a maximum capacity of the group A "1500 sheets". Similarly, the group B selection item 159 includes a group name 159a of "trays 4 and 5" (the fourth paper sheet feeder unit 74 and the fifth paper sheet feeder unit 75) indicating the paper sheet feeder units 70 belonging to the group B, information 159b related to the total remaining amount of the group B, and estimated amount information 159c indicating an estimated total amount of paper sheets "about 800 sheets" with respect to a maximum capacity of the group A "2500 sheets".

The paper sheet replenishment operation is expedited by indicating the paper sheet feeder units 70 forming each group (information related to the feeder unit included in one group), such as the group A selection item 157 and the group B selection item 159. With this arrangement, the user may easily find out when the feeder units are going to run out of paper sheets, or when the feeder units are expected to run out of paper sheets. If the information about the paper sheet feeder units 70 is not indicated, each paper sheet feeder unit 70 may have to be opened to check the remaining paper sheets. Thus the paper sheet replenishment operation is quickly performed.

The name of each paper sheet feeder unit 70 is displayed to indicate the paper sheet feeder unit 70 forming each group. Any information that identifies the paper sheet feeder unit 70 forming a group works appropriately. For example, an image indicating the location of the paper sheet feeder unit 70 forming a group may be displayed on the image forming apparatus 60.

Figure 9:
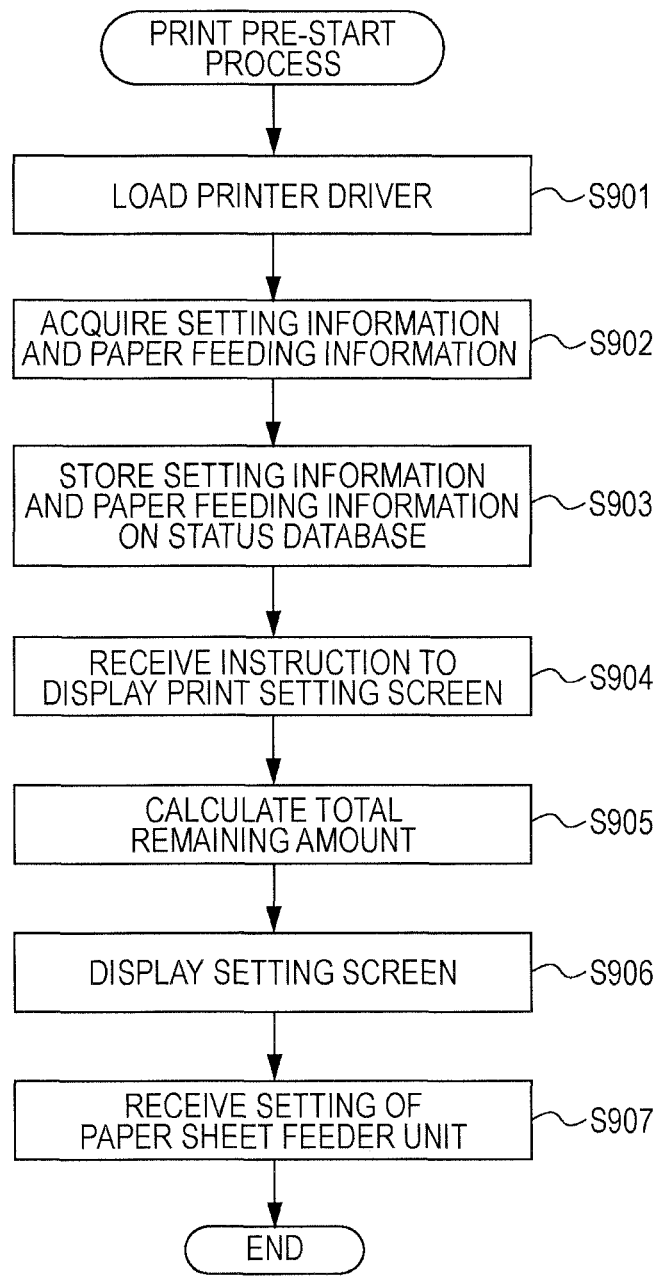
FIG. 9 is a flowchart illustrating an operation example of a print pre-start process on the terminal apparatus.

FIG. 9 is a flowchart illustrating an operation example of a print pre-start process performed by the terminal apparatus 10.

Referring to FIG. 9, the print pre-start process including as part thereof an operation to display the total remaining amount of the group is described below.

Referring to FIG. 9, the application 101 loads the printer driver 102 when the user performs a printing operation (step S901). With the printer driver 102 loaded, the language monitor 104 accesses the MIB information of the image forming apparatus 60 and retrieves the setting information and the paper feeding information (step S902). More specifically, the language monitor 104 retrieves the information related to the group setting of the paper sheet feeder unit 70 stored on the setting information memory 757 as the setting information, and information related to the remaining amount and the sheet size of each of the paper sheet feeder units 70 via the paper sheet sensor 90 as the paper feeding information. The setting information and the paper feeding information retrieved by the language monitor 104 are stored on the status database 110 (step S903).

The control code generator 107 in the printer driver 102 receives an instruction to display the print setting screen 151 (see FIG. 8A) from the user when the user operates the input device 16 (step S904). The control code generator 107 calculates the total remaining amounts of the group A and the group B based on the setting information and paper feeding information stored on the status database 110 (step S905). The control code generator 107 causes the UI display 106 to display the print setting screen 151 based on the calculated total remaining amounts (step S906). The control code generator 107 receives the setting of the paper sheet feeder unit 70 when the user operates the input device 16 in accordance with the print setting screen 151 (step S907). The print pre-start process is thus complete.

In the exemplary embodiment, the printer driver 102 displays the information of the total remaining amount of each of the group A and group B before the image forming apparatus 60 starts image forming. In place of or in addition to the exemplary embodiment described above, the printer driver 102 may display the information of the total remaining amount of each of the group A and group B after the image forming apparatus 60 starts image forming.

Figure 10:
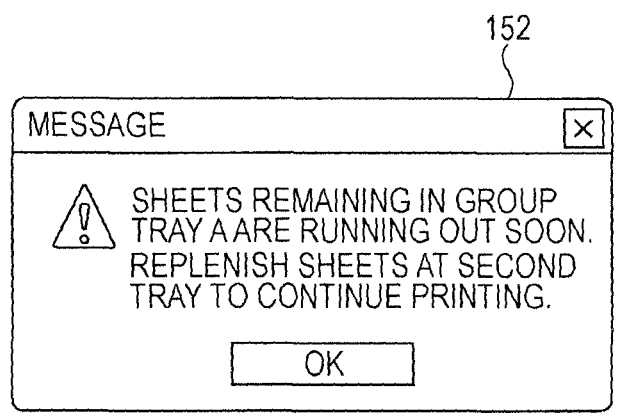
FIG. 10 illustrates an example of an out-of-paper alert screen.
Figure 11:
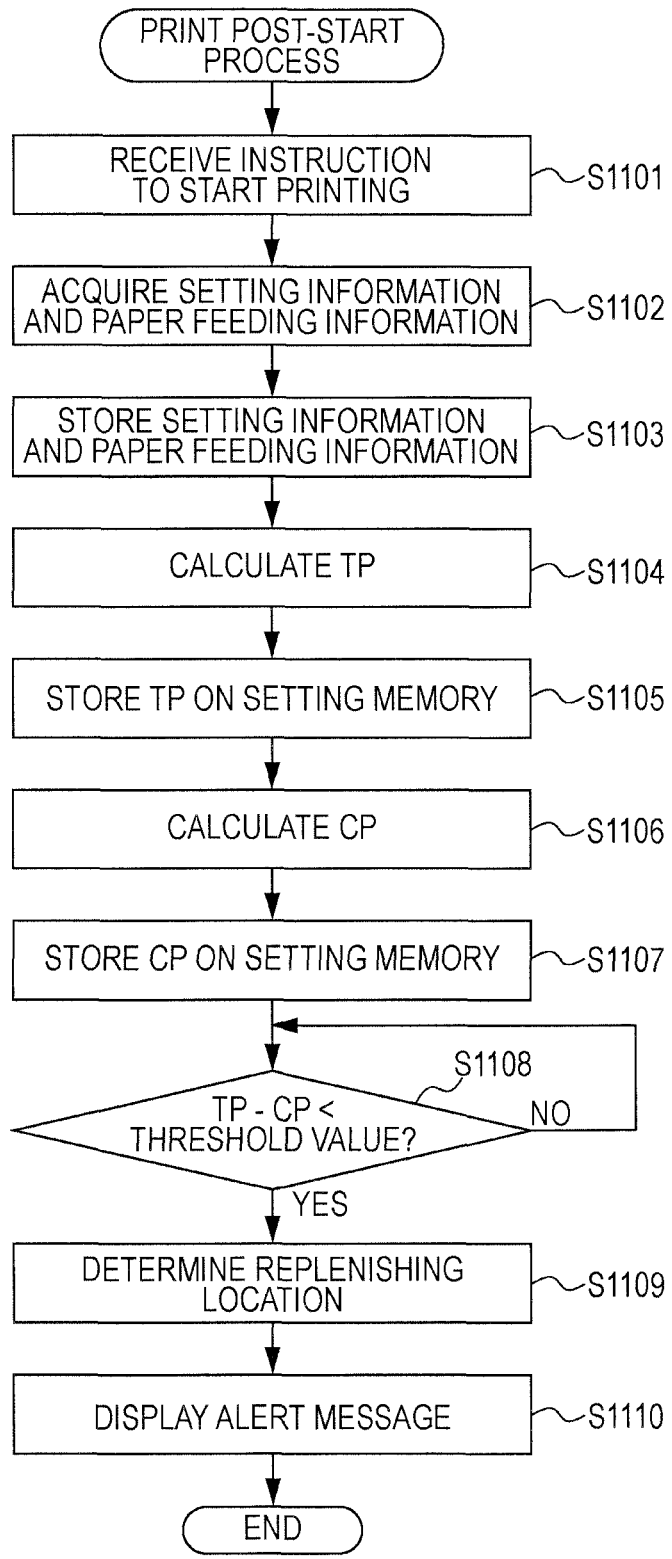
FIG. 11 is a flowchart illustrating an operation example of a print post-start process of the terminal apparatus.

FIG. 10 illustrates an example of an out-of-paper alert screen 152. FIG. 11 is a flowchart illustrating an operation example of a print post-start process of the terminal apparatus 10.

The out-of-paper alert screen 152 is described first with reference to FIG. 10, followed by the description of a specific operation of the out-of-paper alert screen 152 with reference to FIG. 11. The out-of-paper alert screen 152 is displayed if the printer driver 102 determines that the paper sheet feeder unit 70 is going to run out of sheet papers soon. FIG. 10 and FIG. 11 are based on the premise that the paper feeding is performed by the group A.

Referring to FIG. 10, the total remaining amount in the group A may approach zero as the image forming apparatus 60 performs the image forming. The UI display 106 causes the display mechanism 15 to display the out-of-paper alert screen 152 in response to an instruction from the control code generator 107 of the terminal apparatus 10. The out-of-paper alert screen 152 alerts the user to the possibility that an out-of-paper state occurs soon, namely, the paper sheets in the group A are in short supply.

The out-of-paper alert screen 152 in FIG. 10 indicates which of the paper sheet feeder units 70 needs to be replenished. The out-of-paper alert screen 152 indicates that if the "second tray", namely, the second paper sheet feeder unit 72 is replenished with paper sheets, printing will continue without interruptions.

The specific operation of the out-of-paper alert screen 152 is described with reference to FIG. 11.

Upon receiving a print execution instruction from the user (step S1101), the image forming apparatus 60 starts printing. The language monitor 104 accesses the MIB information of the image forming apparatus 60 and retrieves the setting information and paper feeding information (step S1102). The setting information and paper feeding information retrieved at the start of the image forming apparatus 60 are stored on the status database 110 as start setting information and start paper feeding information (step S1103).

The control code generator 107 in the printer driver 102 calculates the start total remaining amount of paper (TP) as the total remaining amount at the start of the image forming in the group A, based on the start setting information and start paper feeding information stored on the status database 110 (step S1104), and then stores the start total remaining amount of paper (TP) on the setting memory 108 in the printer driver 102 (step S1105).

The control code generator 107 starts counting the number of pages of original document data (CP) successively transmitted from the application 101 (step S1106), and successively stores the number of pages (CP) of the original document data on the setting memory 108 in the printer driver 102 (step S1107).

The control code generator 107 determines whether the difference between the start total remaining amount (TP) and the number of pages (CP) is smaller than a threshold value (for example, 100) (step S1108).

If the difference between the start total remaining amount (TP) and the number of pages (CP) is smaller than the threshold value (yes branch from step S1107), in other words, if the total remaining amount of the group A is smaller than a threshold value of 100, the control code generator 107 determines which of the paper sheet feeder units 70 is going to need paper sheet replenishment soon (step S1109). The determination of the paper sheet feeder unit is performed based on the paper feeding information stored on the status database 110. The control code generator 107 causes the UI display 106 to display the out-of-paper alert screen 152 (step S1110).

The out-of-paper alert screen 152 alerts the user that the occurrence of out-of-paper draws near. In place of or in addition to this alert, the out-of-paper alert screen 152 may alert the user to the following possibility. The threshold value may be set to be zero, and if the difference between is smaller than zero, in other words, if the number of pages (CP) is larger than the start total remaining amount (TP), the alert screen 152 may alert the user to the possibility that the paper sheet feeder unit 70 has run of paper sheets.

With reference to FIG. 10 and FIG. 11, the out-of-paper alert screen 152 not only displays that the occurrence of an out-of-paper state draws near and but also indicates which of the paper sheet feeder units 70 needs paper replenishment. The alert screen 152 may include either information that the occurrence of an out-of-paper state draws near or information as to which of the paper sheet feeder units 70 needs paper replenishment.

In the above discussion, the terminal apparatus 10 displays the information related to the total remaining amount of each group. Alternatively, the image forming apparatus 60 may display the information related to the total remaining amount of each group. For example, the control code generator 107 in the printer driver 102 may calculate the total remaining amount of each of the group A and group B based on the setting information and paper feeding information stored on the status database 110 (see step S905). The setting information and paper feeding information may be transmitted to the image forming apparatus 60 via the spooler 103 and the language monitor 104. The UI 79 in the image forming apparatus 60 may display the total remaining amount of each group. In this case, the UI 79 is an example of a display.

In the above discussion, the terminal apparatus 10 calculates the total remaining amount of each group. Alternatively, the sheet feeding information acquisition unit 753 in the image forming apparatus 60 may calculate the total remaining amount.

The program implementing the exemplary embodiment may be provided not only via communication media, but also via a recording medium in a recorded form, such as a compact disk read-only memory (CD-ROM).

A variety of modifications of the exemplary embodiment has been described, and these modifications may be used in combination.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print instruction apparatus comprising:
a group information acquisition unit that acquires information identifying a feeder unit included in a group of two or more feeder units, from among a plurality of feeder units mounted on a printer to feed paper sheets, wherein if one feeder unit in the group runs out of paper sheets during printing, another feeder unit in the group is configured to feed paper sheets; and
a display that acquires information of a remaining amount of paper sheets in each of the feeder units in the group, and displays the remaining amount of paper sheets in each of the feeder units in the group and a total remaining amount of paper sheets in the group based on the acquired information,
wherein the total remaining amount for the group is displayed separately from the remaining amount in each of the feeder units in the group.

2. The print instruction apparatus according to claim 1, wherein the display displays information related to the feeder unit in the group together with the information related to the total remaining amount of paper sheets.

3. The print instruction apparatus according to claim 1, wherein the display displays the information related to the total remaining amount of paper sheets prior to issuing an instruction to start printing to the printer.

4. The print instruction apparatus according to claim 2, wherein the display displays the information related to the total remaining amount of paper sheets prior to issuing an instruction to start printing to the printer.

5. The print instruction apparatus according to claim 1, wherein the display displays the information related to the total remaining amount of paper sheets if the total remaining amount of paper sheets becomes lower than a threshold value as printing progresses during printing, subsequent to issuing an instruction to start printing to the printer.

6. The print instruction apparatus according to claim 2, wherein the display displays the information related to the total remaining amount of paper sheets if the total remaining amount of paper sheets becomes lower than a threshold value as printing progresses during printing, subsequent to issuing an instruction to start printing to the printer.

7. The print instruction apparatus according to claim 3, wherein the display displays the information related to the total remaining amount of paper sheets if the total remaining amount of paper sheets becomes lower than a threshold value as printing progresses during printing, subsequent to issuing an instruction to start printing to the printer.

8. The print instruction apparatus according to claim 4, wherein the display displays the information related to the total remaining amount of paper sheets if the total remaining amount of paper sheets becomes lower than a threshold value as printing progresses during printing, subsequent to issuing an instruction to start printing to the printer.

9. The print instruction apparatus according to claim 1, wherein the display displays an alert screen that indicates information of a feeder unit among the plurality of feeder units that needs to be replenished if the remaining amount of paper sheets of the feeder unit becomes lower than a threshold value.

10. The print instruction apparatus according to claim 1, wherein the display displays an alert screen that indicates information of a feeder unit among the plurality of feeder units that needs to be replenished if the remaining amount of paper sheets of the feeder unit becomes zero.

11. A printer comprising:

a plurality of feeder units that feed paper sheets;

a group information acquisition unit that acquires information identifying a feeder unit included in a group of two or more feeder units, from among the plurality of feeder units, wherein if one feeder unit in the group runs out of paper sheets during printing, another feeder unit in the group is configured to feed paper sheets; and a display that acquires information of a remaining amount of paper sheets in each of the feeder units in the group, and displays the remaining amount of paper sheets in each of the feeder units in the group and a total remaining amount of paper sheets in the group based on the acquired information, wherein the total remaining amount for the group is displayed separately from the remaining amount in each of the feeder units in the group.

12. A printing system comprising:

a printer including a plurality of feeder units that feed paper sheets;

a print instruction apparatus that instructs the printer to print an image;

a group information acquisition unit that acquires information identifying a feeder unit included in a group of two or more feeder units, from among the plurality of feeder units, wherein if one feeder unit in the group runs out of paper sheets during printing, another feeder unit in the group is configured to feed paper sheets; and a display that acquires information of a remaining amount of paper sheets in each of the feeder units in the group, and displays the remaining amount of paper sheets in each of the feeder units in the group and a total remaining amount of paper sheets in the group based on the acquired information, wherein the total remaining amount for the group is displayed separately from the remaining amount in each of the feeder units in the group.

13. A print instruction method comprising:

acquiring information identifying a feeder unit included in a group of two or more feeder units, from among a plurality of feeder units mounted on a printer to feed paper sheets, wherein if one feeder unit in the group runs out of paper sheets during printing, another feeder unit in the group is configured to feed paper sheets; and acquiring information of a remaining amount of paper sheets in each of the feeder units in the group, and displaying the remaining amount of paper sheets in each of the feeder units in the group and a total remaining amount of paper sheets in the group based on the acquired information, wherein the total remaining amount for the group is displayed separately from the remaining amount in each of the feeder units in the group.

14. A non-transitory computer readable medium storing a program causing a computer to execute a process for providing a print instruction, the process comprising:

acquiring information identifying a feeder unit included in a group of two or more feeder units, from among a plurality of feeder units mounted on a printer to feed paper sheets, wherein if one feeder unit in the group runs out of paper sheets during printing, another feeder unit in the group is configured to feed paper sheets; and acquiring information of a remaining amount of paper sheets in each of the feeder units in the group, and displaying the remaining amount of paper sheets in each of the feeder units in the group and a total remaining amount of paper sheets in the group based on the acquired information, wherein the total remaining amount for the group is displayed separately from the remaining amount in each of the feeder units in the group.

\* \* \* \* \*